United States Patent [19]

Gyoda et al.

[11] Patent Number: 4,917,403

[45] Date of Patent: Apr. 17, 1990

[54] WEBBING SUPPORT APPARATUS

[75] Inventors: Toshio Gyoda; Mitsuaki Katsuno, both of Niwa; Motonobu Sugiura, Okazaki, all of Japan

[73] Assignee: Kabushiki Kaisha Tokai-Rika-Denki-Seisakusho, Aichi, Japan

[21] Appl. No.: 341,558

[22] Filed: Apr. 21, 1989

[30] Foreign Application Priority Data

Apr. 25, 1988 [JP] Japan .................. 63-101539

[51] Int. Cl.$^4$ ............................................ B60R 22/20
[52] U.S. Cl. .................................. 280/808; 248/297.3
[58] Field of Search ................ 280/808, 801; 297/483; 248/297.3

[56] References Cited

U.S. PATENT DOCUMENTS

| | | | |
|---|---|---|---|
| 4,398,751 | 8/1983 | Wahlmann et al. | 280/808 |
| 4,569,537 | 2/1986 | Else | 280/808 |
| 4,616,878 | 10/1986 | Fohl | 297/483 |
| 4,640,550 | 2/1987 | Håkansson | 280/808 |

FOREIGN PATENT DOCUMENTS

| | | |
|---|---|---|
| 58-501586 | 9/1983 | Japan . |
| 60-40370 | 12/1985 | Japan . |
| 61-25258 | 2/1986 | Japan . |
| 61-26043 | 2/1986 | Japan . |
| 82/00193 | 4/1983 | PCT Int'l Appl. . |

Primary Examiner—Charles A. Marmor
Assistant Examiner—Karin Tyson
Attorney, Agent, or Firm—Oliff & Berridge

[57] ABSTRACT

A webbing support apparatus being capable of changing a support height of a webbing to be wound around an occupant of a vehicle, which is provided with a slider for supporting the webbing and being movably supported in a vertical direction in a guide rail, and the slider is provided with a restricting member which is engaged with the guide rail during its downward movement to prevent a downward movement of the slider more than a predetermined value. Accordingly, the slider can be positively lowered step by step.

19 Claims, 9 Drawing Sheets

WEBBING SUPPORT APPARATUS

BACKGROUND OF THE INVENTION

1. Field of the Invention

This invention relates to a webbing support apparatus to be used in a seat belt device installed in a vehicle and by which supporting height of a webbing can be varied in response to a physical size of an occupant.

2. Prior Art

A webbing support apparatus of this type is used in a three-point supporting seat belt apparatus of which webbing is of a continuous type. A slip point of the webbing support apparatus is movable in a vertical direction where an intermediate portion of the webbing in a longitudinal direction serves as an upper end of a shoulder webbing portion which is bent and supported.

The conventional webbing support apparatus as described above has been proposed to provide a construction which a moving member is arranged to be guided by a guide rail fixed to a body of a vehicle and can be moved in a vertical direction and then the above-mentioned slip joint is fixed. The moving member is restricted by restricting means against the guide rail under a condition in which its downward movement is prohibited at each of a plurality of vertical positions at the guide rail. The restricted condition can be released by the operating means arranged at the moving member so as to enable a height position of the moving member to be varied (for example, Japanese Utility Model Publication No. 60-40370 and Japanese Patent Application Laid-Open No. 58-501586).

However, since the moving member receives a winding load of the webbing take-up apparatus or its weight or a weight of a slip joint etc., the moving member is apt to simultaneously be moved downwardly along the guide rail when the restricted state is released.

Due to this fact stated above, in particular, in case that a supporting height of the webbing is tried to be lowered, the moving member can not be stopped at a predetermined position and so it is sometimes found that the moving member may move down to a lower moving limitation in contrast to the will of an operator.

SUMMARY OF THE INVENTION

In view of the foregoing, it is an object of the present invention to provide a webbing support apparatus in which a moving member supporting a webbing and movable in a vertical direction by a guide rail is restricted in the guide rail by restricting means so as to be prevented from being moved downwardly at each of a plurality of vertical positions in the guide rail. Accordingly, the moving member can be positively stopped at a restricting position adjacent to a lower restricting position before its movement when the moving member is moved downwardly.

The webbing support apparatus for varying a supporting height comprises:

a guide rail supported by a body of a vehicle;

a moving member supporting a webbing which is guided by a guide rail and capable of being moved in a vertical direction;

restricting means arranged displaceably in the moving member which is engaged with the guide rail at each of plurality of vertical positions of the guide rail and for restricting the moving member against the guide rail so as to restrict its downward movement;

operating means arranged displaceably in the moving member and releasing the restricted condition of the moving member caused by the restricting means; and stopping means arranged displaceably at the moving member which is displaced under the displacing operation of the operating means, and stopping said moving member moved downwardly at either a restricted position adjacent to a part below the restricting position before its movement or above it.

In the present invention which has a construction stated above, the stopping means is displaced by operating the operating means in order to release the restricted condition of the moving member, the stopping means is engaged with the guide rail to stop the moving member moved downwardly at a portion above a restricting position adjacent to a part below the restricting position before movement. While the operating means is displaced, the stopping means keeps this condition. Upon completion of the displacement operation of the operating means, the moving member can be moved downwardly and it is moved downwardly and then its downward movement is restricted by the restricting means.

As described above, the webbing support apparatus of the present invention has an effect of capable of making a positive stopping the moving member at its restricting position adjacent to a part below its restricting position before its movement when the moving member is moved downwardly.

DESCRIPTION OF THE PREFERRED EMBODIMENTS

Figure 1:
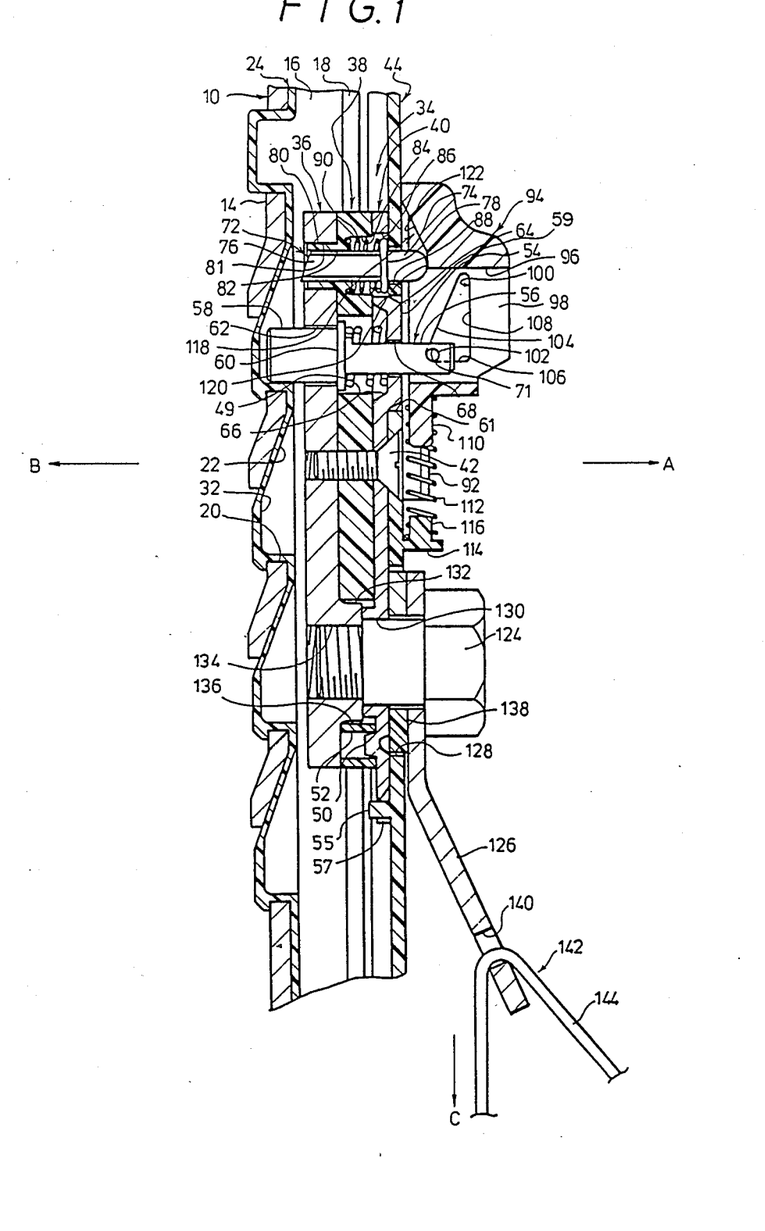
FIG. 1 is a sectional view showing a first preferred embodiment of a webbing support apparatus of the present invention.
Figure 2:
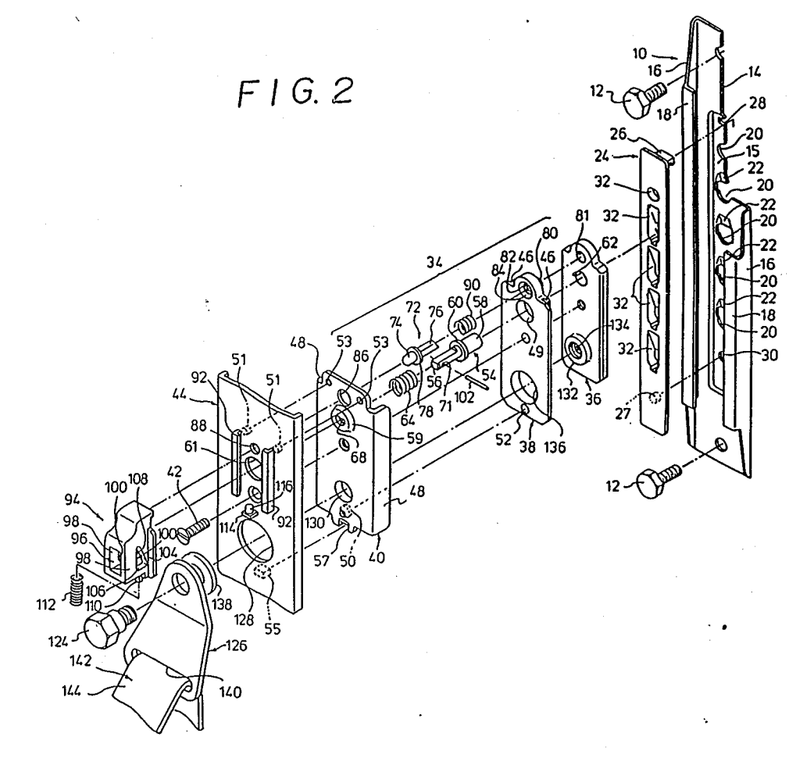
FIG. 2 is an exploded perspective view of FIG. 1.

In FIGS. 1 and 2 is illustrated a first preferred embodiment of a webbing support apparatus of the present invention.

This webbing support apparatus is supported at a body of a vehicle by a way wherein a guide rail 10 has its longitudinal direction as its vertical direction, its upper end and lower end are connected to a center pillar through bolts 12 within a compartment and supported to the body. The guide rail 10 is made of a steel plate and is formed to have a substantial U-shape provided with a base part 14 abutting against a body panel such as a center pillar, a pair of legs 16 bent from both ends of the base part 14 at a right angle, extended and opposed to each other and a pair of flanges 18 bent from both ends of the legs 16 at a right angle toward the end part of the other leg to each other.

The base part 14 is formed with a longitudinal concave part 15 which has a plurality of through-pass holes 20 along its longitudinal direction. The upper-most through-pass hole 20 has a circular section, and the remaining through-pass holes 20 have at their lower half ones a semi-circular section equal to a diameter size of the upper-most through-pass hole 20 and at their upper half ones a rectangular section. An upper edge of the rectangular sectional part of the through-pass hole 20 is concaved from other surfaces of the concave part 15 so as to form an inclined surface 22.

To this guide rail 10 is fixed a cover 24 made of resin. The cover 24 is fixed to the base part 14 while being fitted to the concave part 15 by a way that a hook part 26 formed at its upper end is fitted and engaged in a rectangular through-pass hole 28 made at an upper end of the concave part 15 and a pin part 27 formed at its lower end is fitted to a through-pass hole 30 formed at the lower end of the concave part 15.

A slider 34 acting as the moving member is constructed such that a main block 36, a shoe 38 and a saddle 40 are connected by a flat head machine screw 42 while being in flush with each other. The flat head machine screw 42 also connects a cover plate 44 with them while being in flush with it. The shoe 38 is made of resin and its both ends in its width direction are formed with longitudinally extending grooves 46. To the grooves 46 are relatively slidably fitted the flanges 18 of the guide rail 10. The main block 36 is made of steel, positioned in an inner space of the guide rail 10 and its ends in a width direction are oppositely faced against the flanges 18 with the shoe 38 being located therebetween. With this arrangement, the main block 36 enables the load acting in a direction indicated by an arrowhead A as viewed in FIG. 1 to be supported by the guide rail 10 through flanges 18. The saddle 40 is formed by a steel plate and positioned outside the guide rail 10, and the flanges 48 formed at both ends in a width direction are opposed while being slightly spaced apart from legs 16 of the guide rail 10.

The saddle 40 and the shoe 38 are set at their positions by a way that a projection 50 is fitted in a position setting hole 52. The cover plate 44 and the saddle 40 are set at their positions by a way that a pin part 51 is fitted to a position setting hole 53 and at the same time a tongue part 55 is fitted into the groove 57. A projection 59 formed at the saddle 40 advances into a through-pass hole 61 formed in the cover plate 44.

With is arrangement, the slider 34 is guided by the guide rail 10 and can be moved in a vertical direction by a way that the shoe 38 is slid in respect to the flanges 18.

A lock pin 54 acting as restricting means is supported by the slider 34, and the lock pin 54 is formed with a small diameter shaft 56, a large diameter shaft 58 and a flange 60 with their axes coincided to each other. The large diameter shaft 58 is freely fitted to a through-pass hole 62 formed in the main block 36 with a slight clearance therebetween. Under a condition in which the flange 60 positioned within the through-pass hole 49 formed in the shoe 38 is abutted to the main block 36 around the through-pass hole 62 as shown in FIG. 1, the large diameter shaft 58 is pass through the through-pass hole 62 and project outwardly of the slider 34 and then advance into the position setting hole 32.

A return spring 64 comprised of a compression coil spring is wound around the small diameter shaft 56. The return spring 64 is supported at its one end by the flange 60 and the other end thereof is supported by a bottom part of the concave part 66 formed at a rear part of the projection 59 formed in the saddle 40 so as to cause the lock pin 54 to be biased in a direction indicated by an arrowhead B in FIG. 1. The small diameter shaft 56 is formed to have a uniform sectional shape such as one in which a part of circle is linearly cut away except a part near the flange 60. At a central part of the projection 59 formed at the saddle 40, a through-pass hole 68 is made in correspondance to a sectional shape of the small diameter shaft 56. The small diameter shaft 56 passes through the through-pass hole 68 and then projects outwardly of the slider 34. With this arrangement, the small diameter shaft 56 is prevented from being rotated. At the extremity end of the small diameter shaft 56 is formed with a through-pass hole 71 extending along a width direction of the slider 34.

The stopper pin 72 acting as stopping means is supported by the slider 34 above the lock pin 54, and the stopper pin 72 is formed with a circular section shaft 74. A rectangular section shaft 76 and a flange 78 with their axes are coincided to each other. The rectangular section shaft 76 is formed as a substantial rectangular section in which a circumference of a circle is linearly cut to form it. The shoe 38 is formed with a projection 80 and the projection 80 is positioned within the through-pass hole 81 made at the main block 36. At the central part of the projection 80 is formed a through-pass hole 82 having a shape corresponding to a sectional shape of the rectangular section shaft 76. The shoe 38 is formed with a concave part 84 having a larger diameter than the projection 80 with its axis coincided with the projection 80 at a surface opposite to the surface where the projection 80 is formed and the through-pass hole 82 is opened at the bottom part of the concave part 84. The rectangular section shaft 76 is freely fitted to the through-pass hole 82 with a slight clearance therebetween.

The saddle 40 is formed with a through-pass hole 86 having a substantial same diameter as that of the former in opposition to the concave part 84. And the cover plate 44 is formed with a through-pass hole 88, in opposition to the through-pass hole 86, which is larger in its diameter than that of the circular section shaft 74 and smaller than that of the flange part 78. The stopper pin 72 is arranged under such a condition that the flange part 78 is abutted against the cover plate 44 around the through-pass hole 88 as shown in FIG. 1, an extremity end of the rectangular section shaft 76 is projected slightly from the slider 34. However, the stopper pin 72 is not overlapped with the cover 24 in its vertical direction, the slider 34 is not prohibited from vertically moving, but if the stopper pin is further projected from this condition toward the direction indicated by the arrowhead B in FIG. 1, it may overlap with the cover 24 to enable the vertical movement of the slider 34 to be prohibited. In addition, under a condition shown in FIG. 1, the circular section shaft 74 projects through the through-pass hole 88. The rectangular section shaft 76 includes a return spring 90 composed of a compression spring wound around it, one end of the return spring is supported at the bottom part of the concave part 84 and the other end of the return spring is supported by the flange 78 to bias the stopper pin 72 toward the direction indicated by the arrowhead A in FIG. 1.

An extremity end of the rectangular section shaft 76 is formed such that its extremity surface is in parallel with an inclined surface of a position setting hole 32 of the cover 24 and an extremity end of the circular section shaft 74 is formed as a spherical surface.

An operating button 94 which serves as operating means is guided by a pair of guiding projections 92 projected at the surface of the cover plate 44, in parallel to each other and extending in a vertical direction and then is movable in a vertical direction. The operating button 94 is cooperatively related with the lock pin 54 and the stopper pin 72.

That is, the operating button 94 is formed with a hollow part 96 at its part corresponding to the lock pin 54, and through-pass holes 100 having a right triangular shape are formed in opposite to each other at each of a pair of side walls 98 positioned at both sides of the hollow part 96. In turn, an intermediate part of a pin 102 is fitted to the through-pass hole 71 made at the small diameter shaft 56 of the lock pin 54, and both ends of the pin 102 are opposed against inclined surfaces 104 of the circumferential edge of the through-pass hole 100. In case of a condition shown in FIG. 1, both ends of the pin 102 are positioned at end portions of the inclined surfaces 104 at a short side surface 106.

Accordingly, if the operating button 94 is moved downwardly from the condition shown in FIG. 1, the pin 102 rises up relatively on the inclined surfaces 104, resulting in that the pin 102 is moved in a direction indicated by the arrowhead A in FIG. 1 and further the lock pin 54 moves toward a direction indicated by the arrowhead A in FIG. 1 against a biasing force of the return spring 64. Under a condition in which both ends of the pin 102 are positioned at end portions of the inclined surfaces 104 of long side surfaces 108, the large diameter shaft part 58 of the lock pin 54 is completely projected out of the position setting holes 32 of the cover 24 and so the lock pin 54 does not prohibit a vertical movement of the slider 34.

An upper end of a return spring 112 composed of a compression spring is wound around a projection 110 formed at the lower end of the operating button 94, and the upper end of the return spring 112 is supported at a circumferential surface of the projection 110. A lower end of the return spring 112 is wound around a projection 116 further projected at a tongue part 114 projected at a surface of the cover plate 44 and then the lower end is supported by the tongue part 114. With this arrangement, the operating button 94 is biased upwardly by the return spring 112, so that a downward operating movement is carried out against a biasing force of the return spring 112 and then it is moved upwardly by a biasing force of the return spring 112. Rising limit and descending limit of the operating button 94 become the positions where each of the short side surfaces 106 and the long side surfaces 108 is abutted against both end surfaces of the pin 102.

The operating button 94 is formed with an abutment surface 118 with the circular section shaft 74 at a position corresponding to the stopper pin 72. This abutment surface 118 is composed of a parallel surface 120 which is in parallel with a surface of the cover plate 44 and an inclined surface 122 which is inclined in respect to a surface of the cover plate 44 as shown in FIG. 1, an extremity end of the circular section shaft 74 is abutted against the parallel surface 120. If the operating button 94 is moved downwardly from a condition shown in FIG. 1, the extremity end of the circular section shaft 74 is pressed by the inclined surface 122 and then moved in a direction indicated by the arrowhead B in FIG. 1. With this arrangement, the stopper pin 72 is moved in a direction indicated by the arrowhead B in FIG. 1 against a biasing force of the return spring 90.

Under a condition that the lock pin 54 is moved in a direction indicated by the arrowhead A in FIG. 1 up to a position where the lock pin 54 may not prohibit a vertical movement of the slider 34 as described above. The stopper pin 72 is projected in a direction indicated by the arrowhead B in FIG. 1 up to a position where the rectangular section shaft 76 is overlapped with the cover 24 within the position setting hole 82 in its vertical direction.

In addition, the operating button 94 is provided with a cap cover (not shown) and this cap cover may cover an entire operating button 94 and cover the return spring 112 to shield it.

A slip joint 126 is fixed to the slider 34 through a stepped bolt 124. The stepped bolt 124 may pass through a through-pass hole 128 formed in the cover plate 44 and a burring hole 130 formed in the saddle 40 and then is threadably fitted to a threaded hole 134 formed at a central part of a convex part 132 projected at the main block 36. The flange part of the burring hole 130 and the convex part 132 are positioned within a through-pass hole 136. The slip joint 126 is rotatably pivoted at a cylindrical part of the stepped bolt 124. At the cylindrical part of the stepped bolt 124 is supported a spacer 138 having a thicker thickness than that of the cover plate 44 between the slip joint 26 and the saddle 40 and then the slip joint 126 is spaced apart from the surface of the cover plate 44.

A webbing 142 is inserted into a longitudinal hole 140 of the slip joint 126 and an intermediate longitudinal part of a webbing 142 is bent and slidably supported. A bent part of the webbing 142 at the slip joint 126 becomes an upper end of a shoulder webbing 144 and further a take-up load acts in a direction of an arrowhead C in FIG. 1 against the webbing 142 by a webbing take-up device (not shown).

An action of the preferred embodiment of the present invention will be described.

In order to reduce a supporting height of the webbing 142 from a condition shown in FIG. 1, the operating button 94 is moved downwardly against a biasing force of the return spring 112. As the operating button 94 is operated and moved downwardly, the lock pin 54 is moved in a direction indicated by the arrowhead A and then is pulled out of a position setting hole 32. In simultaneous with a pulling-out of the lock pin 54 from the position setting hole 32, the slider 34 starts to move downwardly by its own weight or a weight of the slip joint 126 or a take-up load of the webbing take-up device (not shown).

Figure 3:
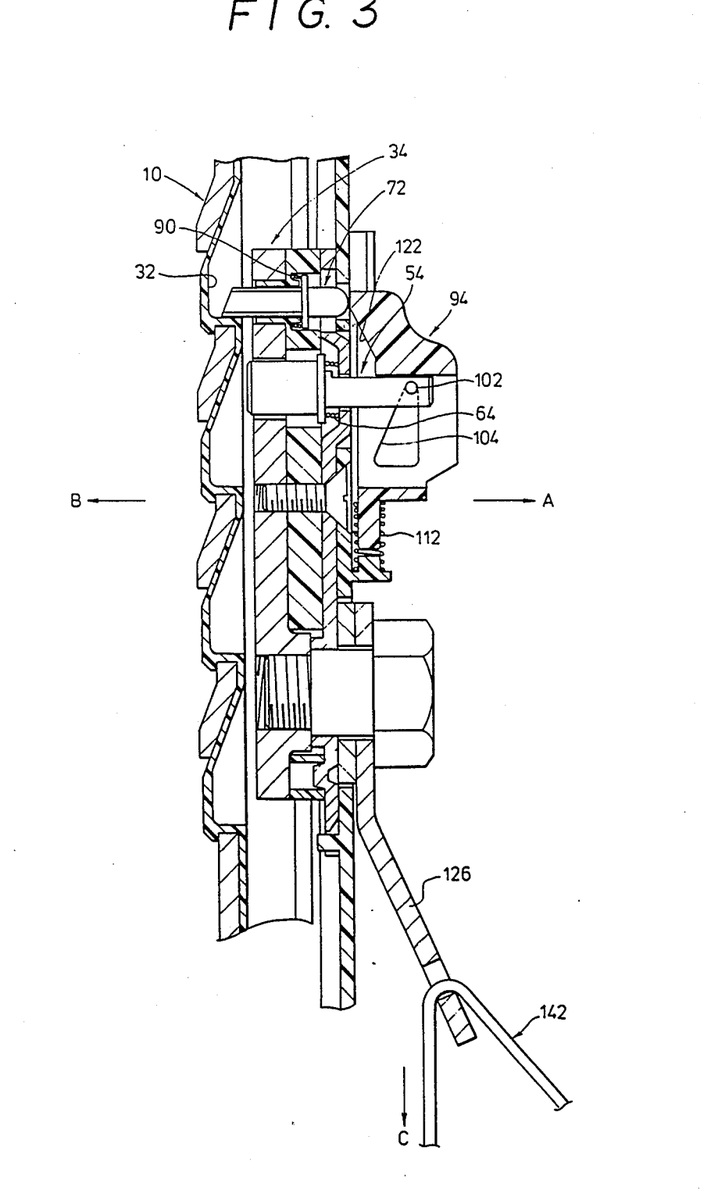
FIG. 3 is a sectional view for showing an operational condition of the first preferred embodiment in correspondence with FIG. 1.

In turn, as the operating button 94 is moved as described above, the stopper pin 72 moves in a direction indicated by the arrowhead B in opposition to the lock pin 54 and when the lock pin 54 is pulled out of the position setting hole 32, it may advance inwardly of the position setting hole 32. Accordingly, the slider 34 which started to move downwardly is prevented from being further moved downwardly by an abutment of the stopper pin 72 against the lower wall of the position setting hole 32 as shown in FIG. 3.

In this case, upon completion of the operating button 94, the operating button 94 is moved upwardly under a biasing of the return spring 112. As the operating button 94 is moved upwardly, the stopper pin 72 is biased by the return spring 90 and moved in a direction indicated by the arrowhead A, resulting in that it is pulled out of the position setting hole 32. In simultaneous with a pulling out of the stopper pin 72 from the position setting hole 32, the slider 34 starts to move downwardly under an action of a take-up load in the same manner as described above.

In turn, as the operating button 94 is moved as described above, the lock pin 54 is biased by the return spring 64 in opposition to the stopper pin 72 and moved in a direction indicated by the arrowhead B and at the time when the stopper pin 72 is pulled out of the position setting hole 32, it may advance into the position setting hole 32. Accordingly, the slider 34 started to move downwardly is further prevented from being moved downwardly under an abutment of the lock pin 54 against the lower wall of the position setting hole 32 in the same manner as found in FIG. 1. This condition corresponds to a state where a supporting height of the webbing 142 is further lowered. In addition, in case that the supporting height is further lowered, it is sufficient to repeat the operation similar to that described above by a required number of times.

In this way, in case that a supporting height of the webbing 142 is to be lowered, the slider 34 is stopped at a next step adjacent to the lower one without fail, so that the slider does not move downwardly too much in contrast to a will of the operator.

In case that the supporting height of the webbing 142 is increased, the operating button 94 is moved upwardly. In this case, since the operating button 94 is positioned at its upper limit position in respect to the cover plate 44, it may not be relatively moved in respect to the cover plate 44, and the slider 34 moves upwardly together with the operating button 94 through the pin 102 and the lock pin 54. In this case, the lock pin 54 is moved in a direction indicated by the arrowhead A against a biasing force of the return spring 64 due to the fact that the extremity end of the large diameter shaft 58 is pushed against the inclined surface of the position setting hole 32, thereby it may be biased by the return spring 64 at a position corresponding to the upper position setting hole 32 and moved in a direction indicated by the arrowhead B, advancing into the position setting hole 32.

Under a condition in which the supporting height of the webbing 42 is in its highest position, the lock pin 54 advances into the upper-most step position setting hole 32. Since the upper-most step position setting hole 32 has no inclined surface, it is not possible to move the slider 34 normally more than the hole.

In addition, in the above-described preferred embodiment, in case that the slider 34 is moved upwardly, a load acting on the slider 34 is supported by the short side surfaces 106 of the operating button 94 through the pin 102. The cover plate 44 could be provided with stopper means for restricting an ascending limit of the operating button 94 and then the load could be supported at the abutment part with the stopper means.

Figure 4:
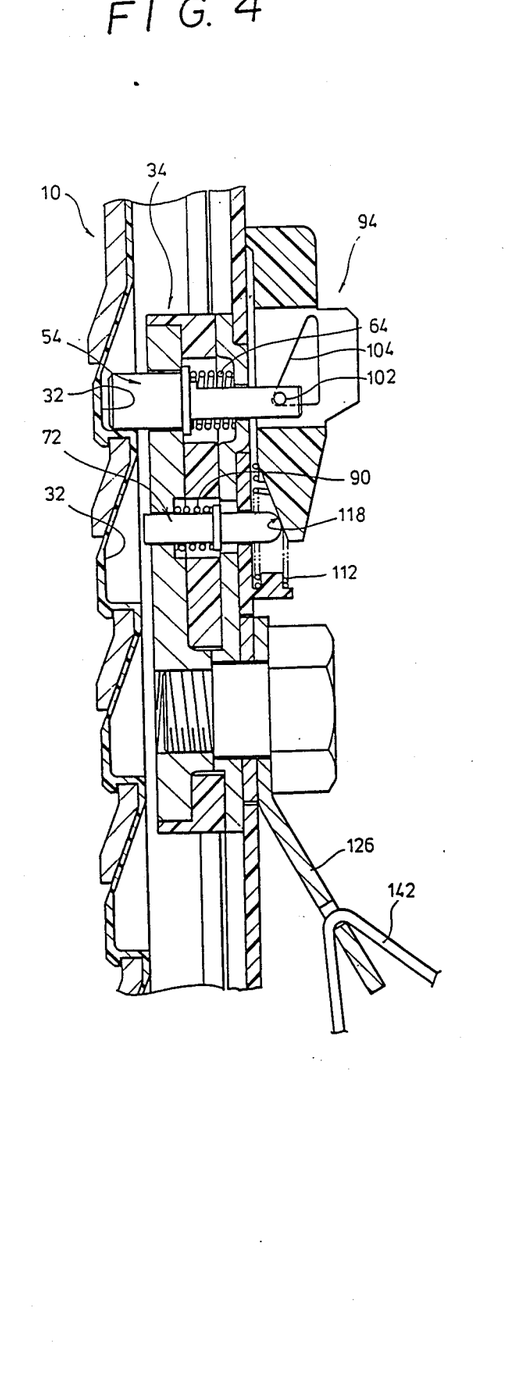
FIG. 4 is a sectional view showing a second preferred embodiment of the present invention in correspondence with FIG. 1.

In FIG. 4 is illustrated a second preferred embodiment of the present invention.

It is a major difference between this preferred embodiment and the first preferred embodiment that the stopper pin 72 is arranged below the lock pin 54 and an abutment surface 118 with the stopper pin 72 is arranged at a lower end of the operating button 94, and other configurations thereof are basically the same as that of the former preferred embodiment.

Figure 5:
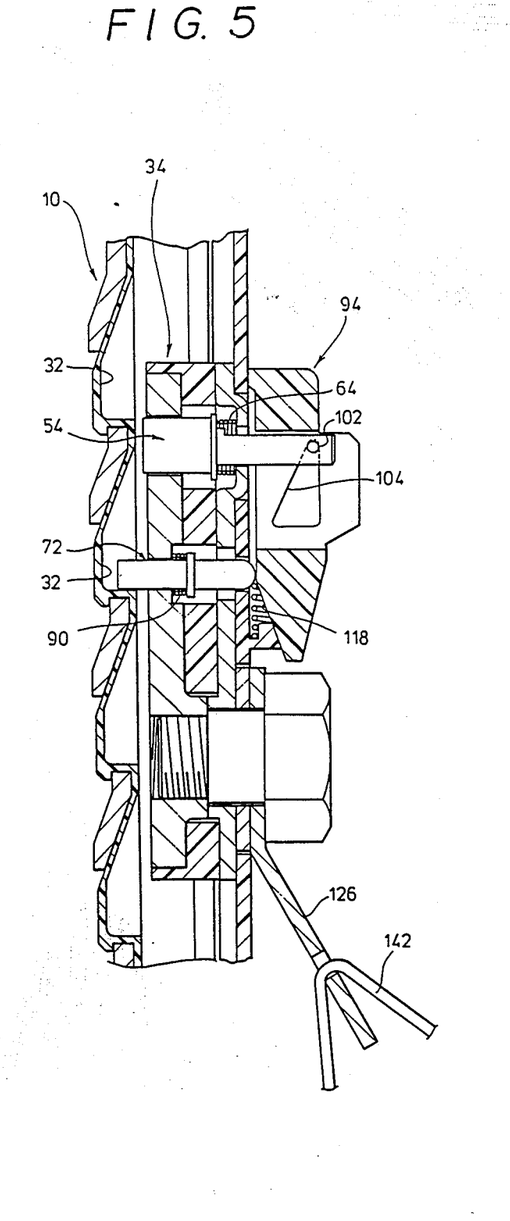
FIG. 5 is a sectional view showing an operational condition of a second preferred embodiment of the present invention in correspondence with FIG. 4.

In this preferred embodiment, its action is basically the same as that of the above-described first preferred embodiment. However, in the first preferred embodiment, although it is constructed such that the stopper pin 72 may enter the position setting hole 32 where the lock pin 54 already occupies until now so as to prevent a downward movement of the slider 34, the present preferred embodiment is constructed such that as shown in FIG. 5, the stopper pin 72 enters the position setting hole 32 placed at a position where the lock pin 54 is tried to move so as to prevent a downward movement of the slider 34.

Figure 6:
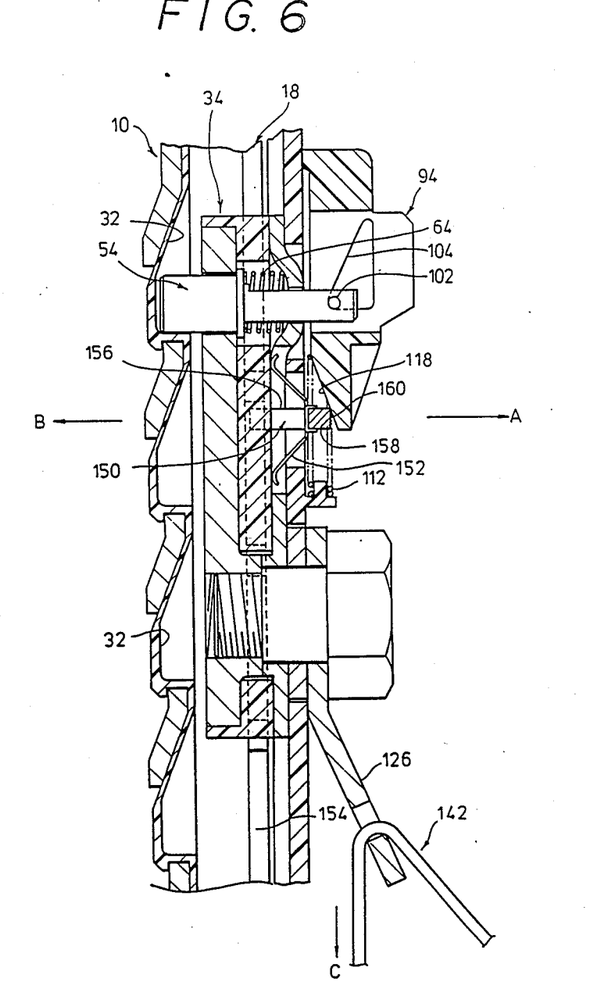
FIG. 6 is a sectional view showing a third preferred embodiment of the present invention in correspondence with FIG. 1.
Figure 7:
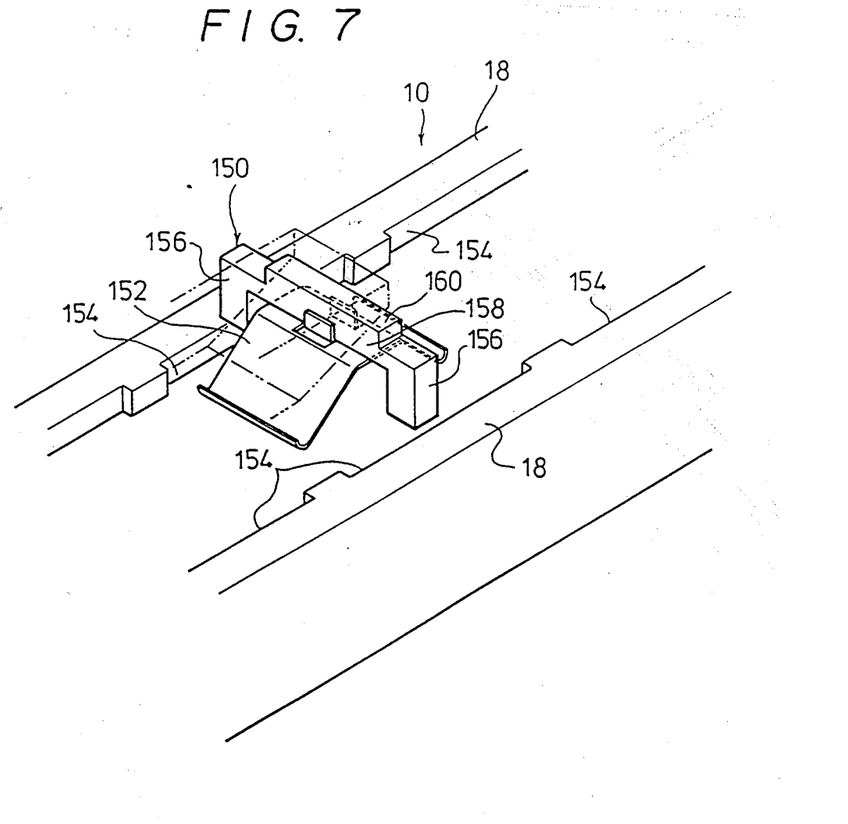
FIG. 7 is an exploded perspective view showing a substantial part of the third preferred embodiment of the present invention.

A third preferred embodiment is illustrated in FIGS. 6 and 7.

In this preferred embodiment, the stopping means is basically different from the above-mentioned first and second preferred embodiments and in this case a stopper plate 150 is used in place of the stopper pin 72 in the above-described preferred embodiments. The stopper plate 150 is of a gate shape and attached to the slider 34 in such a way as it may be moved in directions indicated by arrows A and B and at the same time it may be biased by a return spring 152 made of a leaf spring in a direction indicated by the arrowhead A.

In turn, the guide rail 10 has a recess 154 at its flanges 18. This recess 154 is set to have a positional relationship corresponding to each of the position setting holes 32. The stopper plate 150 is constructed such that its both legs 156 can enter a pair of opposing recesses 154. The stopper plate 150 is operated such that a projection 160 projected at the base part 158 is pressed and abutted against the abutting surface 118 formed in the operating button 94 so as to be limited for its movement toward the direction indicated by the arrowhead A.

Under the condition shown in FIG. 6 where the operating button 94 is not operated, the stopper plate 150 is positioned at a moving line toward the direction indicated by the arrowhead A and under this condition, the leg 156 does not advance into the recess 154. As the operating button 94 is moved downwardly in order to reduce a webbing support height from this condition, the abutment surface 118 may press the stopper plate 150 against a biasing force of the return spring 152 and cause it to move in a direction indicated by the arrowhead B. Under a condition in which the lock pin 54 is pulled out of the position setting hole 32, the leg 156 is advanced into the recess 154 and as the leg 156 is abutted against the side edge of the recess 154, a downward movement of the slider 34 is prevented.

Upon completion of the operating button 94, the stopper plate 150 is biased by the return spring 152 and moved in a direction indicated by the arrowhead A and then the leg 156 is retracted from the recess 154. At this time, since the lock pin 54 is advanced into the position setting hole 32, the slider 34 is stopped without fail at a next step adjacent to and below it in the same manner as that of the previous preferred embodiment.

Figure 8:
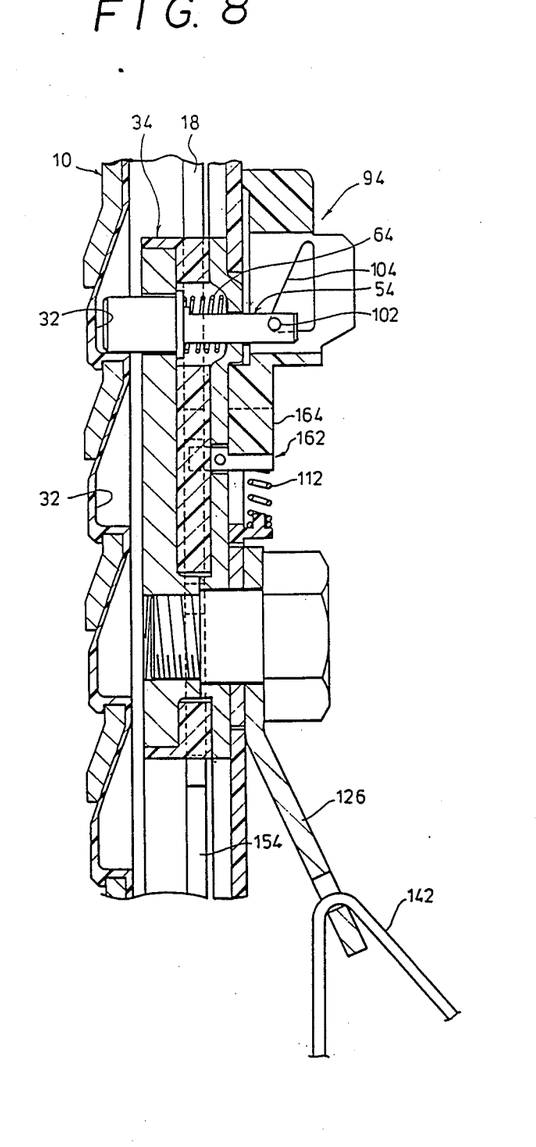
FIG. 8 is a sectional view showing a fourth preferred embodiment of the present invention in correspondence with FIG. 1.
Figure 9:
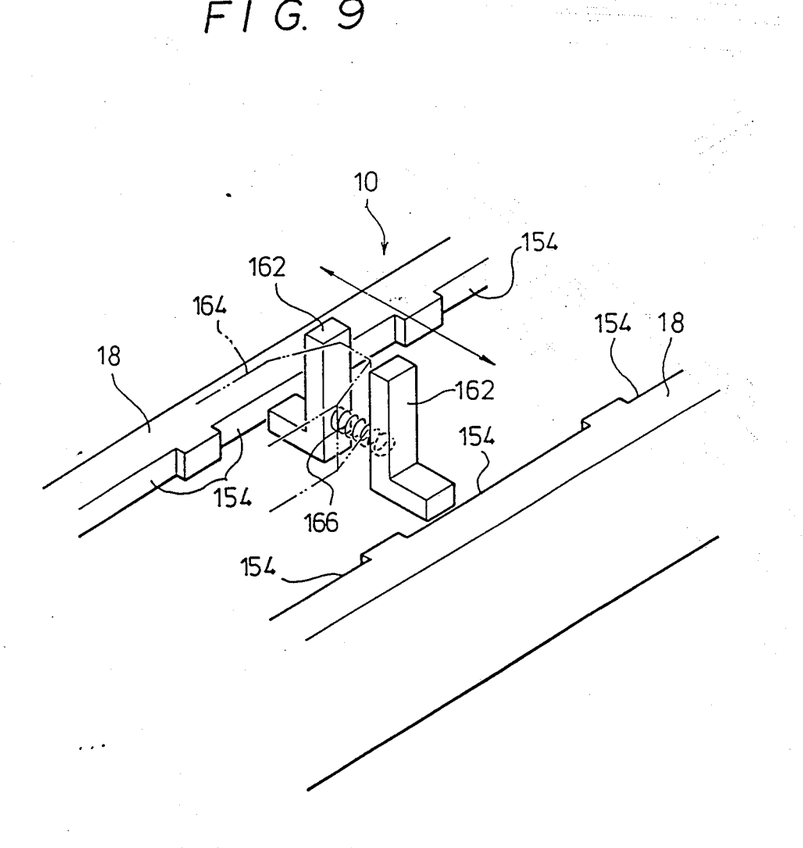
FIG. 9 is a schematic perspective view showing a substantial part of the fourth preferred embodiment of the present invention.

In FIGS. 8 and 9 is illustrated a fourth preferred embodiment of the present invention.

In this preferred embodiment, the stopping means is constructed by a pair of L-shaped stopper fittings 162 in place of the stopper plate 150 in the third preferred embodiment. The stopper fittings 162 are attached to the slider 34 in such a way as they are movable in a direction indicated by arrowheads shown in FIG. 9. The operating button 94 is formed with a tapered tongue 164 in place of the abutment surface 118 illustrated in the first to third preferred embodiments. Each of the stopper fittings 162 is positioned at both ends of the tongue 164, respectively, and biased by a return spring 166 so as to press and hold the tongue 164.

A pair of stopper fittings 162 has a minimum spaced-apart distance under a condition in which the operating button 94 is not operated. If the operating button 94 is operated, it may be moved by the tongue 164 against a biasing force of the return spring so as to increase the spaced-apart distance. Then, it may enter the recess 154 formed at one of the flanges 18 of the guide rails 10 so as to prevent a downward movement of the slider 34. Advancing and retracting timing of the stopper fitting 152 into or out of the recess 154 is similar to that of the third preferred embodiment.

What is claimed is:

1. A webbing support apparatus capable of varying a support height of a webbing to be installed in a vehicle comprising:
    a guide rail supported on a body of the vehicle;
    a moving member supporting said webbing, guided by said guide rail and capable of being moved in a vertical direction;
    restricting means displaceably arranged in the moving member, engaged with the guide rail at each of a plurality of vertical positions of said guide rail and restricting the moving member against the guide rail so as to prevent a downward movement of the moving member;
    operating means displaceably arranged in said moving member, operated to be displaced and releasing the restricted condition of said moving member through said restricting means; and
    stopping means displaceably arranged in said moving member, displaced by said displacing operation of said operating means and stopping said moving member from being moved further downwardly either at a restricting position adjoining to a position below the restricting position before its movement or at a position above the restricting position.

2. A webbing support apparatus according to claim 1, wherein said restricting means and said stopping means are arranged in said moving member in such a way as they are displaced in an opposite direction to each other by said displacing operation of said operating means.

3. A webbing support apparatus according to claim 2, wherein said operating means is provided with returning means for returning it to its original position after said operating means has been displaced.

4. A webbing support apparatus according to claim 1, wherein said guide rail is provided with position setting holes at said plurality of vertical positions, said restricting means is inserted into one of said position setting holes to restrict said moving member against the guide rail and is provided with an engaging part which is pulled out of said position setting hole through said displacing operation of the operating means to release the restricted condition of said moving member.

5. A webbing support apparatus according to claim 4, wherein said stopping means is provided with an inserting part inserted into one of said position setting holes to stop said moving member.

6. A webbing support apparatus according to claim 5, wherein between said moving member and said restricting means is installed a first biasing means for biasing said restricting means toward a direction in which said engaging part of said restricting means is inserted into one of said position setting holes.

7. A webbing support apparatus according to claim 6, wherein between said moving member and said stopping means is provided a second biasing means for biasing said stopping means toward a direction in which said inserting part is pulled out of one of said position setting holes.

8. A webbing support apparatus according to claim 7, wherein said position setting holes are provided with inclined guide surfaces for guiding said engaging part so as to be pulled out of said holes against a biasing force of said first biasing means by being slidably contacted with said engaging part of said restricting means when said slide member is moved upwardly.

9. A webbing support apparatus according to claim 7, wherein said operating means is provided with a first displacing means for moving said restricting means against a biasing force of said first biasing means toward a direction in which said engaging part is pulled out of said hole when said displacing operation is performed.

10. A webbing support apparatus according to claim 9, wherein said operating means is provided with a second displacing means for moving said stopping means against a biasing force of said second biasing means toward a direction in which said insertion part of said stopping means is inserted into one of said holes when said displacing operation is performed.

11. A webbing support apparatus according to claim 5, wherein said stopping means is constructed such that said inserting part is inserted into said one of said position setting holes into, which said engaging part had been inserted before performing said displacing operation of said operating means under said displacing operation of said operating means.

12. A webbing support apparatus according to claim 5, wherein said stopping means is constructed such that said inserting part is inserted into a position setting hole below said one of said position setting holes into which said engaging part had been inserted before said displacing operation of said operating means through said displacing operation of said operating means.

13. A webbing support apparatus according to claim 4, wherein said guide rail is provided with a concave part into which a part of said stopping means is inserted under said displacing operation of said operating means to perform said stopping operation of said moving member.

14. A webbing support apparatus according to claim 13, wherein said concave part is arranged at least at one of the longitudinal directions of a chassis.

15. A webbing support apparatus capable of changing a supporting height of a webbing to be wound around an occupant of a vehicle comprising:
    an elongated guide rail supported by a body of the vehicle and extending in a vertical direction of the body;
    a moving member supporting said webbing and movably supported by said guide rail in a vertical direction;
    position setting holes spaced apart by a predetermined space at said guide rail along its longitudinal direction;
    a restricting member supported by said moving member for restricting a downward movement of said moving member by being selectively engaged in said position setting holes;

an operating member supported by said moving member in such a way as it may be slid downwardly and for releasing the engagement of the restricting member with said position setting holes through said sliding operation; and a stopping member displaceably supported on said moving member, displaced through said sliding operation of said operating member and engaged with said guide rail to prevent a downward movement of said moving member more than a predetermined distance.

16. A webbing support apparatus according to claim 15, wherein said stopping member is arranged above said restricting member in such a way as it is inserted into and engaged with a position setting hole into which said restricting member has been engaged before said sliding operation of said operating member under a sliding operation of said operating member.

17. A webbing support apparatus according to claim 15, wherein said supporting member is arranged below said restricting member in such a way as it may be inserted into and engaged with a position setting hole adjacent to a part below a position setting hole into which said restricting member had been engaged before sliding operation of said operating member through said sliding operation of said operating member.

18. A webbing support apparatus according to claim 15, wherein said guide rail is provided with a concave part to which a part of said stopping member is engaged through a sliding operation of said operating member.

19. A webbing support apparatus according to claim 18, wherein a pair of said concave parts are arranged in a longitudinal direction of a chassis, said stopping member is provided with a stopper part which is moved in a direction spaced part to each other through a sliding operation of said operating member and engaged with said concave parts.

* * * * *